United States Patent
Nan et al.

(10) Patent No.: US 12,334,245 B2
(45) Date of Patent: Jun. 17, 2025

(54) INTEGRATING TRANS-INDUCTOR VOLTAGE REGULATOR (TLVR) IN VERTICAL POWER DELIVERY

(71) Applicant: Google LLC, Mountain View, CA (US)

(72) Inventors: Chenhao Nan, Santa Clara, CA (US); Houle Gan, Santa Clara, CA (US); Runruo Chen, Sunnyvale, CA (US); Qiong Wang, Palo Alto, CA (US); Xin Li, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/798,347

(22) Filed: Aug. 8, 2024

(65) Prior Publication Data

US 2024/0395453 A1 Nov. 28, 2024

Related U.S. Application Data

(63) Continuation of application No. 17/358,354, filed on Jun. 25, 2021, now Pat. No. 12,159,738.

(51) Int. Cl.
*H01F 27/28* (2006.01)
*H01F 27/06* (2006.01)
*H01F 27/24* (2006.01)

(52) U.S. Cl.
CPC ......... *H01F 27/2804* (2013.01); *H01F 27/06* (2013.01); *H01F 27/24* (2013.01); *H01F 2027/065* (2013.01); *H01F 2027/2809* (2013.01)

(58) Field of Classification Search
CPC ...... H01F 27/2804; H01F 27/06; H01F 27/24; H01F 2027/065; H01F 2027/2809
See application file for complete search history.

(56) References Cited

U.S. PATENT DOCUMENTS

| | | |
|---|---|---|
| 10,014,798 B1 | 7/2018 | Vinciarelli |
| 11,848,140 B2 | 12/2023 | Ahmed et al. |
| 11,876,445 B2 * | 1/2024 | Zhou ..................... H02M 3/155 |
| 2010/0026095 A1 | 2/2010 | Phadke |

(Continued)

OTHER PUBLICATIONS

Fast multi-phase trans-inductor voltage regulator. Technical Disclosure Commons. Defensive Publication Series, Art. 2194. May 9, 2019. 15 pages. Retrieved from the Internet: <https://www.tdcommons.org/dpubs_series/2194/>.

(Continued)

*Primary Examiner* — Rafael O De Leon Domenech
(74) *Attorney, Agent, or Firm* — Lerner David LLP

(57) ABSTRACT

The subject matter described herein provides systems and techniques for the integration of TLVR technology in a vertical power VR module. A multiple-secondary TLVR topology using a controlled leakage inductance in the place of a separate compensation inductor, Lc, may be employed for the vertical power VR module. In addition, the capacitance inside the device to which the TLVR based vertical power VR module supplies power, rather than an output capacitance board, may be used in order to allow the module to be a single layer. Example structures that may include one or more primary windings and/or one or more secondary windings for each of possibly multiple linked phases of the TLVR based module are provided. The windings may be formed using traditional copper windings or printed circuit board (PCB) copper trace winding.

18 Claims, 12 Drawing Sheets

(56) References Cited

U.S. PATENT DOCUMENTS

2018/0278174 A1   9/2018   Chen
2022/0006394 A1   1/2022   Jin et al.
2022/0109368 A1   4/2022   Zhou et al.

OTHER PUBLICATIONS

Vertical Power Delivery Structure for Ultra-High Current Applications. Technical Disclosure Commons. Defensive Publications Series, Art. 1534. Sep. 26, 2018. 9 pages. Retrieved from the Internet: <https://www.tdcommons.org/dpubs_series/1534/>.
Elasser et al. A Merged-Two-Stage LEGO-PoL Converter with Coupled Inductors for Vertical Power Delivery. Oct. 11, 2020. 2020 IEEE Energy Conversion Congress and Exposition (ECCE), IEEE, pp. 916-923.
Elasser et al. Modeling and Design of Vertical Multiphase Coupled Inductors with Inductance Dual Model. Jun. 14, 2021. 2021 IEEE Applied Power Electronics Conference and Exposition (APEC), IEEE, pp. 1717-1724.
Baek et al. 3D LEGO-PoL: A 93.3% Efficient 48V-1.5V 450A Merged-Two-Stage Hybrid Switched-Capacitor Converter with 3D Vertical Coupled Inductors. Jun. 14, 2021. 2021 IEEE Applied Power Electronics Conference and Exposition (APEC), IEEE, pp. 1321-1327.
Extended European Search Report for European Patent Application No. 22154729.2 dated Jul. 21, 2022. 12 pages.
Office Action for European Patent Application No. 22154729.2 dated Apr. 22, 2025. 10 pages.

\* cited by examiner

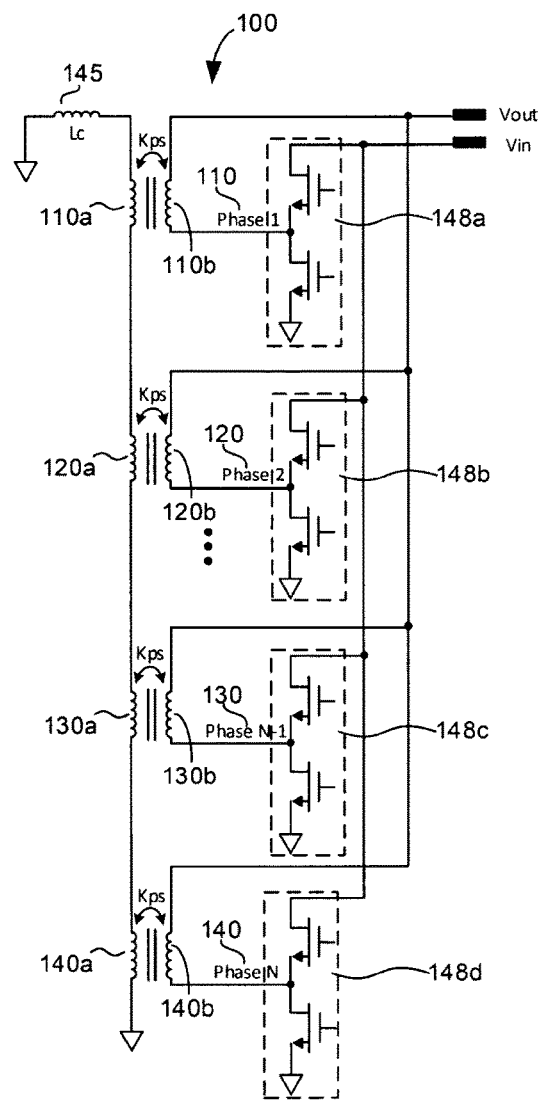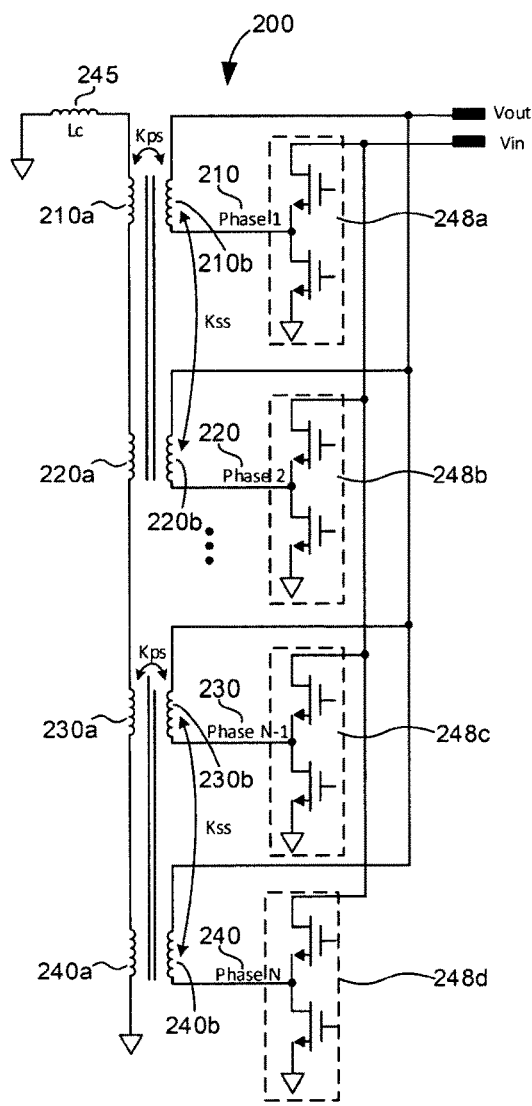
FIG. 1A
FIG. 1B

INTEGRATING TRANS-INDUCTOR VOLTAGE REGULATOR (TLVR) IN VERTICAL POWER DELIVERY

CROSS-REFERENCE TO RELATED APPLICATION

The present application is a continuation of U.S. patent application Ser. No. 17/358,354, filed Jun. 25, 2021, the disclosure of which is hereby incorporated herein by reference.

BACKGROUND

Power delivery for Application-Specific Integrated Circuits (ASICs) and/or processing units (xPUs), such as Central Processing Units (CPUs) and/or Graphics Processing Units (GPUs), for Artificial Intelligence (AI) and/or Machine Learning (ML) applications in data centers are trending toward ultra-high current demand. For example, such applications may demand greater than 1000 A of current. Vertical power delivery design, as opposed to traditional lateral power delivery, was proposed to resolve various issues with delivering such ultra-high current laterally. In vertical power delivery, a Voltage Regulator (VR) module, including its associated output decoupling capacitance, may be placed on the bottom side of a motherboard and aligned well with the ASIC and/or xPU device, which the VR module powers, on the top side of the motherboard. To meet the transient performance requirements using this technique, a significant amount of decoupling capacitance may have to be included in the VR module, and/or the VR module may have to operate at a very high frequency, such as greater than 5 MHz. The high frequency operation of the VR module may make the module less efficient and generate more power loss, which may impact and pose challenges to the thermal design for the VR module. Including a large amount of output capacitance in the vertical power VR module may also present additional design challenges. Moreover, in such a scenario, an inefficient and complicated multi-layer structure for the VR module is typically used.

BRIEF SUMMARY

Trans-Inductor Voltage Regulator (TLVR) technology is an ultra-fast transient performance VR technology with several advantages. The present disclosure describes the integration of a TLVR technology in a vertical power VR module. Such a TLVR based vertical power VR module, also known as a TLVR based module, may make use of a single-secondary or a multiple-secondary TLVR circuit topology. The use of the TLVR in the vertical power VR module may have a controlled lumped leakage inductance, eliminating the use of a compensation inductor, Lc, typically associated with the primary windings of TLVR based power designs. Such elimination of the compensation inductor, Lc, may allow for significant amounts of additional space and an increased power density on the vertical power VR module integrated with the TLVR technology. In addition, such a TLVR based vertical power VR module may make use of significantly less output capacitance than conventional VR modules. This may allow the TLVR based module to be designed as a single multi-layer PCB structure, referred to as single-layer below, instead of the multi-layer structure design associated with a conventional VR module. In particular, with a TLVR based vertical power VR module, the decoupling capacitors of the application-specific integrated circuit (ASIC), or other device, on which the module is implemented may be used as the module output capacitance, so that a single multi-layer PCB structure could be used.

Therefore, such a TLVR based module may have electrical and mechanical portions that are simplified compared to conventional VR modules. As a result, mass production manufacturing concerns associated with conventional VR modules, such as those concerns associated with a multi-layer structure design, may be reduced. In addition, as a result, such a TLVR based module may have a reduced number of electrical and/or mechanical components on the module, which may increase the reliability of the VR module while also increasing the efficiency of the VR module. The single-layer design may also include benefits such as a reduced weight, a thinner VR module design, elimination of a layer-to-layer bonding interface, and reduced reflow times, which may also result in greater reliability. Such a single-layer TLVR based vertical power VR module design, described herein, may also enable better transient performance and better manufacturability.

Several example structures of TLVR based vertical power VR modules are provided herein. The TLVR based modules may include one primary winding and/or one or more secondary windings, such as eight windings for each of possibly multiple linked phases. Each inductor/transformer associated with each phase may use either traditional copper windings or PCB copper trace windings.

In general, one aspect of the subject matter described in this specification includes a single-layer vertical power Voltage Regulator (VR) module. The module may include multiple primary windings coupled in series. The multiple primary windings may be associated with inductors of the single-layer vertical power VR module. The module may further include multiple secondary windings. Each of the secondary windings may be magnetically coupled with at least one winding of the multiple primary windings. The multiple secondary windings may be associated with the inductors of the single-layer vertical power VR module. The single-layer vertical power VR module may include a leakage inductance configured to act as a compensation inductor associated with the plurality of primary windings. The single-layer vertical power VR module may not be coupled to an output capacitance board. The multiple primary windings and the multiple secondary windings may include magnetic cores. Each primary winding of the multiple primary windings and each secondary winding of the multiple secondary windings may be implemented with copper windings or PCB copper trace windings. Each of the transformers/inductors of the single-layer vertical power VR module may be associated with a respective phase of the single-layer vertical power VR module. Each of the phases of the single-layer vertical power VR module may be configured to receive a pulse width modulation signal. Each of multiple phases of the single-layer vertical power VR module may be configured to receive the pulse width modulation signal concurrently. The number of the phases of the single-layer vertical power VR module may be 24. The pulse width modulation signal may include multiple pulses that are interleaved based on a number of phases of the single-layer vertical power VR module. The single-layer vertical power VR module may be directly coupled to a printed circuit board (PCB) associated with a processing unit. The single-layer vertical power VR module may use Trans-Inductor Voltage Regulator (TLVR) technology.

Another aspect of the subject matter includes a processing device. The processing device may include a processing unit. The processing device may further include a printed circuit board (PCB) in communication with the processing unit. The processing device may also include a Trans-Inductor Voltage Regulator (TLVR) based vertical power Voltage Regulator (VR) module in communication with and directly coupled to the printed circuit board. The TLVR based vertical power VR module may not include a capacitance board. The TLVR based vertical power VR module may include a single layer. The TLVR based vertical power VR module may include a leakage inductance configured to act as a compensation inductor. A compensation inductor may be coupled in series to multiple primary windings of the TLVR based vertical power VR module. The multiple primary windings of the TLVR based vertical power VR module may each be in communication with multiple secondary windings of the TLVR based vertical power VR module.

Yet another aspect of the subject matter includes a process of providing power to a processing unit. An input pulse width modulation signal and an input voltage signal may be received in parallel at multiple phases of a Trans-Inductor Voltage Regulator (TLVR) based vertical power Voltage Regulator (VR) module. A current may be produced at each phase of the multiple phases using the input pulsed signal and the input voltage signal. A signal to power the processing unit based on the produced current may be output. Each phase of the plurality of phases may include at least one primary winding and at least one secondary winding. The current may be produced using at least one primary winding. The signal to power the processing unit may be affected by a capacitance inside of the processing unit, instead of an output cap-board.

BRIEF DESCRIPTION OF THE DRAWINGS

FIG. 1A depicts a first Trans-Inductor Voltage Regulator (TLVR) module circuit topology, which may be known as a single-secondary TLVR circuit topology.

FIG. 1B depicts a second TLVR circuit topology, which may be known as a multiple-secondary TLVR based module circuit topology.

DETAILED DESCRIPTION

Figure 2:
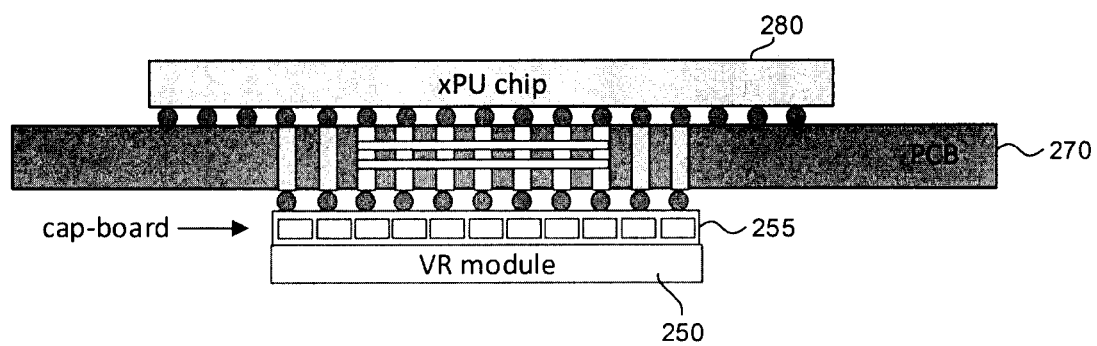
FIG. 2 depicts a conventional multi-layer vertical power Voltage Regulator (VR) module with a capacitance board, also known as a cap-board.

FIG. 1A depicts a first Trans-Inductor Voltage Regulator (TLVR) circuit topology 100, which may be known as a single-secondary TLVR circuit topology. TLVR circuit topology 100 may have N phases, where N is an integer number. For example, TLVR circuit topology 100 may include a first phase 110, a second phase 120, ..., a $(N-1)^{th}$ phase 130, and an $N^{th}$ phase 140. Each phase of TLVR circuit topology 100 may be associated with a transformer, which may also be known as a TLVR inductor. Each TLVR inductor may include a primary winding and a secondary winding that serves as an output inductor for each phase. For example, the first phase 110 may have secondary winding 110b and primary winding 110a. The second phase 120 may have secondary winding 120b and primary winding 120a. The $(N-1)^{th}$ phase 130 may have secondary winding 130b and primary winding 130a. The $N^{th}$ phase 140 may have secondary winding 140b and primary winding 140a. The primary windings, such as primary windings 110a, 120a, 130a, and 140a, may be connected in series to each other and with an optional compensation inductor, Lc, 145.

TLVR circuit topology 100 may also include additional circuitry, such as transistor(s), inductors, or capacitors. For example, each phase of TLVR circuit topology 100 may include transistors 148a, 148b, 148c, and 148d. Each of transistors 148 may include a voltage signal input connected to the drain of a first transistor, which has its source connected to a secondary winding associated with the phase and the drain of a second transistor, which has its source connected to ground. A voltage signal output may be connected to the secondary winding associated with the phase. In some examples, a TLVR circuit may include multiple secondary windings associated with multiple phases.

FIG. 1B depicts a second TLVR circuit topology 200, which may be known as a multiple-secondary TLVR circuit topology. TLVR circuit topology 200 may be similar to TLVR circuit topology 100, but TLVR circuit topology 200 may include multiple secondary windings associated with each phase and TLVR inductor. In TLVR circuit topology 200, each phase is associated with two secondary windings. For example, TLVR circuit topology 200 may include a first phase 210, a second phase 220, ..., a $(N-1)^{th}$ phase 230, and an $N^{th}$ phase 240. Each phase of TLVR circuit topology 200 may be associated with a transformer, which may also be known as a TLVR inductor. Each TLVR inductor may include a primary winding and two or more secondary windings that serve as output inductors for each phase. For example, the TLVR inductor for the first phase 210 and the second phase 220 may have a respective primary winding 210a and 220a, and the two secondary windings 210b and 220b. The TLVR inductor for the $(N-1)^{th}$ phase 230 and the Nth phase 240 may have a respective primary winding 230a and 240a, and the two secondary windings 230b and 240b. The primary windings, such as primary windings 210a, 220a, 230a, and 240a, may be connected in series to each other and with an optional compensation inductor, Lc, 245.

TLVR circuit topology 200 may also include additional circuitry, such as transistor(s), inductors, or capacitors. For example, each phase of TLVR circuit topology 200 may include transistors 248a, 248b, 248c, and 248d. Each of transistors 248 may include a voltage signal input connected to the drain of a first transistor, which has its source connected to a secondary winding associated with the phase and the drain of a second transistor, which has its source connected to ground. A voltage signal output may be connected to the secondary winding associated with the phase.

FIG. 2 depicts a conventional multi-layer vertical power Voltage Regulator (VR) module 250 with a capacitance board, also known as a cap-board 255. Cap-board 255 may embed a large number of output capacitors. Multi-layer vertical power VR module 250 may be coupled to a printed circuit board (PCB) 270, which may be coupled to a processing unit, such as xPU chip 280. Using conventional multi-layer vertical power VR module 250 with the cap-board 255 may add additional weight and mechanical complexity to the VR module. As a result, the manufacturing quality and reliability may be impacted.

Figure 3:
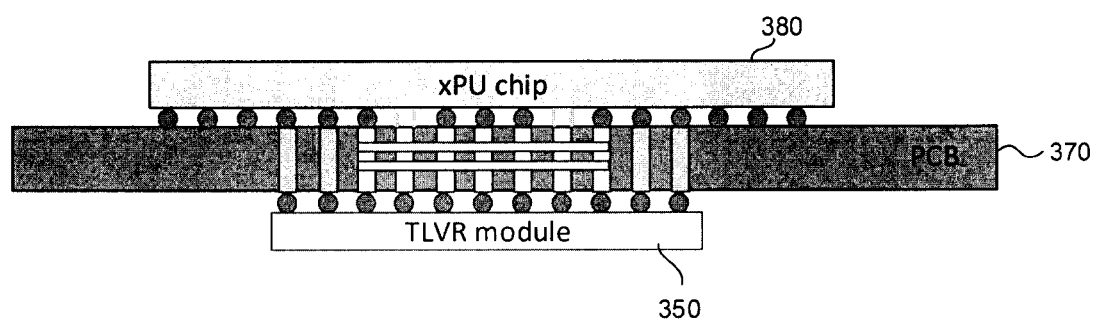
FIG. 3 depicts a single-layer TLVR based vertical power VR module, which does not include a cap-board.

FIG. 3 depicts a single-layer TLVR based vertical power VR module 350, which does not include a capacitance board, such as cap-board 255 described in connection with FIG. 2. The single-layer TLVR based vertical power VR module 350 may be directly coupled to a printed circuit board (PCB) 370, which may be coupled to a processing unit, such as xPU chip 380. With the VR module 350 it may be feasible to achieve greater than 1 MHz VR control bandwidth with a relatively low switching frequency and a high efficiency. The use of the VR module 350 may reduce the output capacitance that may be used for vertical power delivery. The VR module 350 may be implemented, for example, on an Application Specific Integrated Circuit (ASIC), a Field Programmable Gate Array (FPGA), a Programmable Logic Device (PLD), a specialized or a general purpose Digital Signal Processor, a controller, a state machine, gated logic, discrete hardware components, or any other suitable devices. The single-layer TLVR based module 350 may rely on the in-package capacitors, referred to as package capacitance below, of the application-specific integrated circuit (ASIC), or other device, on which it is implemented, in place of an output VR capacitance board. This package capacitance may be used by the VR module 350 instead of it using any additional VR output capacitance board in either the VR module or a motherboard on which the single-layer TLVR based vertical power VR module 350 operates. Therefore, the VR module 350 may not include a capacitance board, such as cap-board 255 described in connection with FIG. 2. The VR module 350 may or may not include capacitors serving as the output capacitance of the TLVR circuit on the module.

As a result of integrating little or no output capacitance, the implementation of the TLVR based vertical power VR module 350 may be simplified when compared with the implementation of a multi-layer VR module such as VR module 250 of FIG. 2, which may integrate a significant amount of output capacitors. The device on which VR module 350 operates may include input capacitors, power stages, and the single-layer TLVR based vertical power VR module. Such a single-layer design may include benefits such as a reduced weight, a thinner VR module design, elimination of a layer-to-layer bonding interface, and reduced reflow times, which may result in greater reliability.

Figure 4:
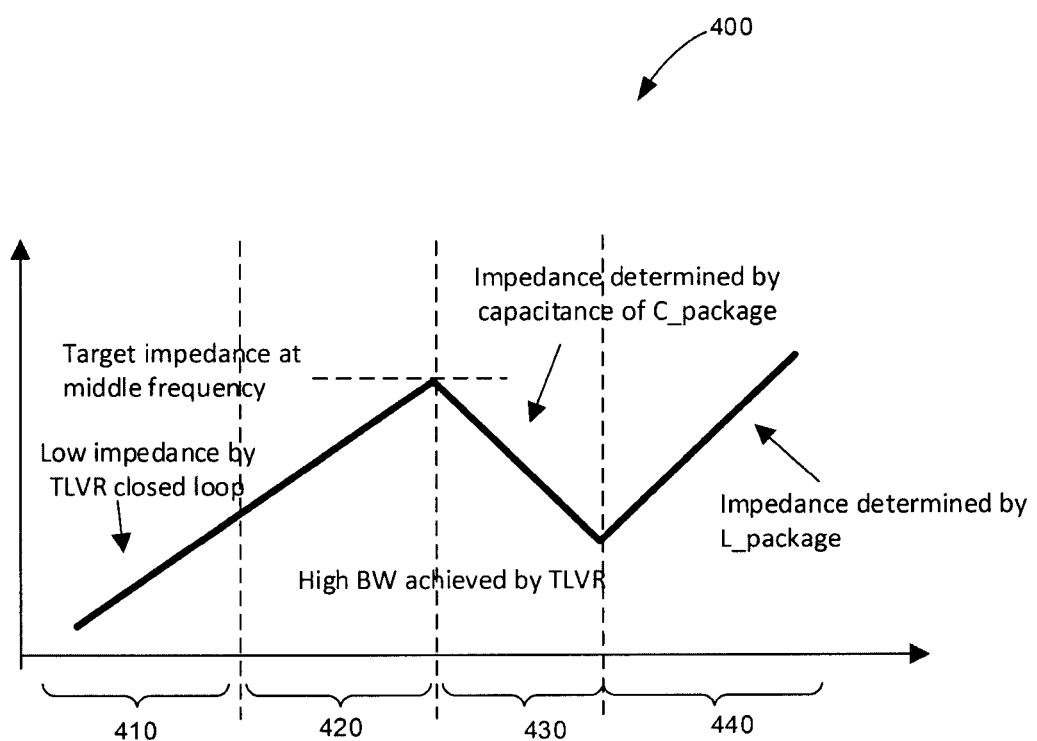
FIG. 4 depicts an illustrated and approximate impedance curve with a high bandwidth achieved by using a single-layer TLVR based vertical power VR module.

FIG. 4 depicts an illustrated and approximate impedance curve 400 with a high bandwidth achieved by using a single-layer TLVR based vertical power VR module, such as VR module 350 described in connection with FIG. 3. Such a TLVR based module may rely on the package capacitance of the ASIC, or other device, on which it is implemented. The impedance curve 400 includes a low frequency section 410, a middle frequency section 420, a high frequency section 430, and a higher frequency section 440. The impedance curve 400 shows the Power Delivery Network (PDN) impedance as seen from a processing unit chip, such as xPU chip 380 described in connection with FIG. 3, to which the TLVR based module delivers power. The processing unit chip package may be the location where VR remote sensing occurs. In the low frequency section 410, the impedance curve 400 shows a low impedance as a result of the TLVR based module closed loop design. In the middle frequency section 420 and the high frequency section 430, impedance curve 400 shows a target impedance being achieved in the middle and high frequency range. This may indicate that a high bandwidth is possibly achieved by the TLVR based module. In the high frequency section 430, the impedance curve 400 shows that the impedance is determined by the package capacitance, C_package, of the ASIC, or other device, on which the TLVR based module is implemented. In the higher frequency section 440, the impedance curve 400 shows that the impedance is determined by the package inductance, L_package, of the ASIC, or other device, on which the TLVR based module is implemented.

Figure 5:
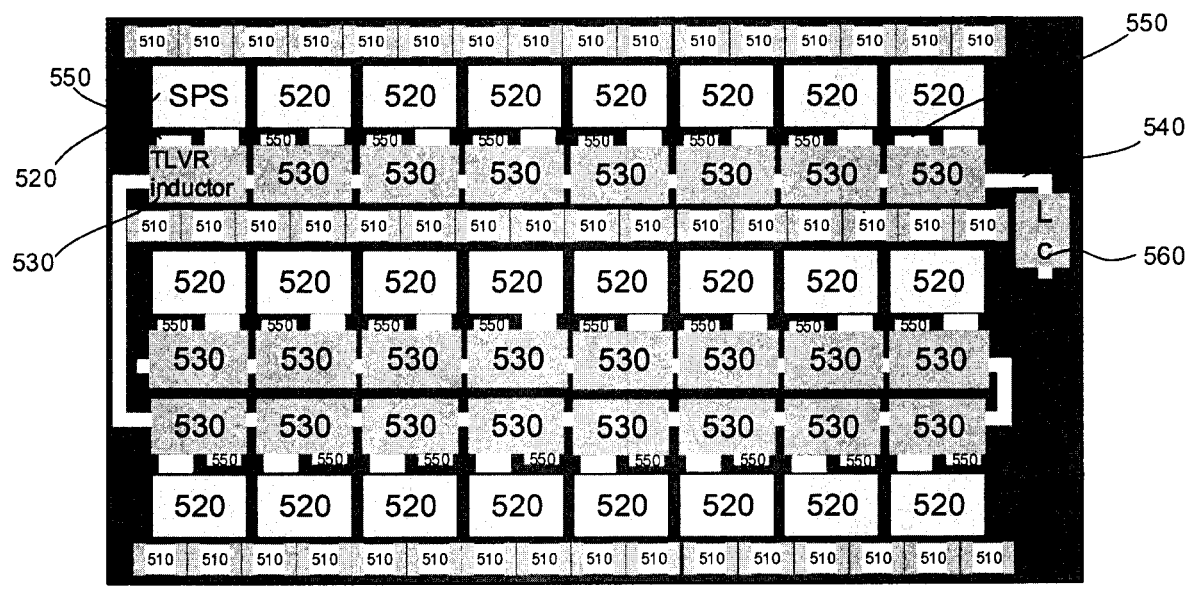
FIG. 5 depicts an illustration of a single-layer vertical power VR module design that uses a single-secondary TLVR circuit topology.

FIG. 5 depicts an illustration of a single-layer vertical power VR module design 500 that uses a single-secondary TLVR circuit topology. The single-layer TLVR based vertical power VR module design 500 includes input capacitors 510, smart power stages (SPSs) 520, TLVR inductors 530, primary windings 540, secondary windings 550, and a compensation inductor, Lc, 560, associated with the primary windings 540. The VR module design 500 includes a single-secondary TLVR circuit topology, such as TLVR circuit topology 100 described in connection with FIG. 1a. The primary windings 540 of the VR module design 500 may be connected in series with each other. Each of the secondary windings 550 may be inductively coupled to one of the primary windings 540 in each of the TLVR inductors 530.

Figure 6:
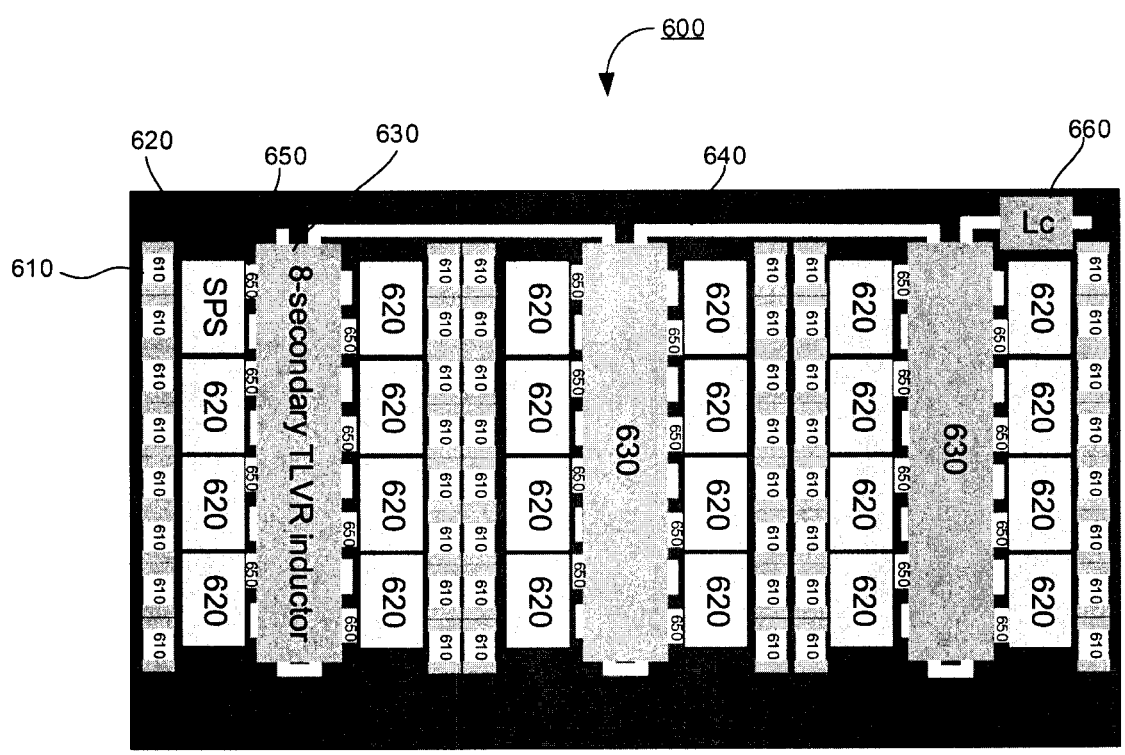
FIG. 6 depicts an illustration of a single-layer vertical power VR module design that uses a multiple-secondary TLVR based module circuit topology.

FIG. 6 depicts an illustration of a single-layer vertical power VR module design 600 that uses a multiple-secondary TLVR circuit topology. The single-layer TLVR based vertical power VR module design 600 includes input capacitors 610, smart power stages (SPSs) 620, TLVR inductors 630, one or more sets of primary windings 640, secondary windings 650, and a compensation inductor, such as compensation inductor, Lc, 660, associated with each set of primary windings 640. The VR module design 600 may include a multiple-secondary TLVR circuit topology, such as TLVR circuit topology 200 described in connection with FIG. 1b. For example, the VR module design 600 is shown as including an 8-secondary TLVR inductor based TLVR circuit topology. Each set of primary windings 640 of the VR module design 600 may be connected in series with each other. Each set of the primary windings 640 may be inductively coupled with multiple secondary windings 650 in each of the TLVR inductors 630.

Such a VR module design 600 that includes multiple-secondary TLVR circuit topology may satisfy vertical power requirements by improving power density, transient performance, and power-delivery efficiency, when compared to the VR module design 500 described in connection with FIG. 5. The VR module design 600 structure may include TLVR inductors 630 that may either include traditional copper wire windings or PCB copper trace windings. Although the VR module design 600 includes an 8-secondary TLVR circuit topology, a TLVR circuit topology with 2 to 8, or even more, secondary windings may be used. Considerations for the use of a particular TLVR circuit topology may include phase count flexibility, ferrite core manufacturability, and VR electrical performance.

Figure 7:
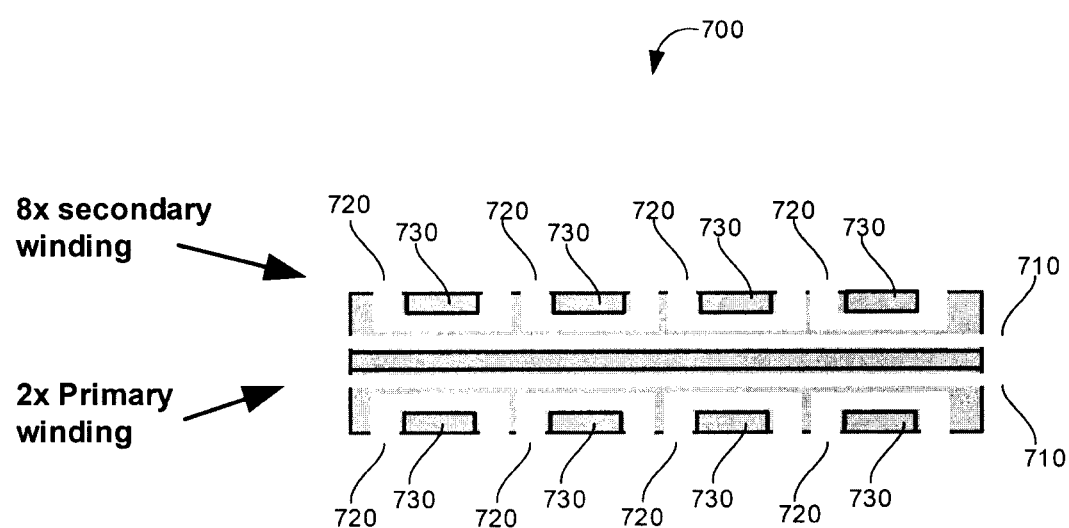
FIG. 7 depicts a cross-section, top view of the illustration of a multiple-secondary TLVR inductor.

FIG. 7 depicts a cross-section 700, top view of the illustration of a multiple-secondary TLVR inductor. For example, cross-section 700 shows a top view of the 8-secondary TLVR inductor used in the VR module design 600 described in connection with FIG. 6. The cross-section 700 includes primary windings 710 and secondary windings 720. The cross-section 700 shows two primary windings 710 and eight secondary windings 720. Ferrite and/or magnetic cores 730 may be associated with the primary windings 710 and the secondary windings 720. In particular, the ferrite and/or magnetic cores may be at the center of each of the secondary windings 720, and in between the primary windings 710. In addition, the secondary windings 720 may each be wound around the ferrite and/or magnetic cores 730.

Figure 8:
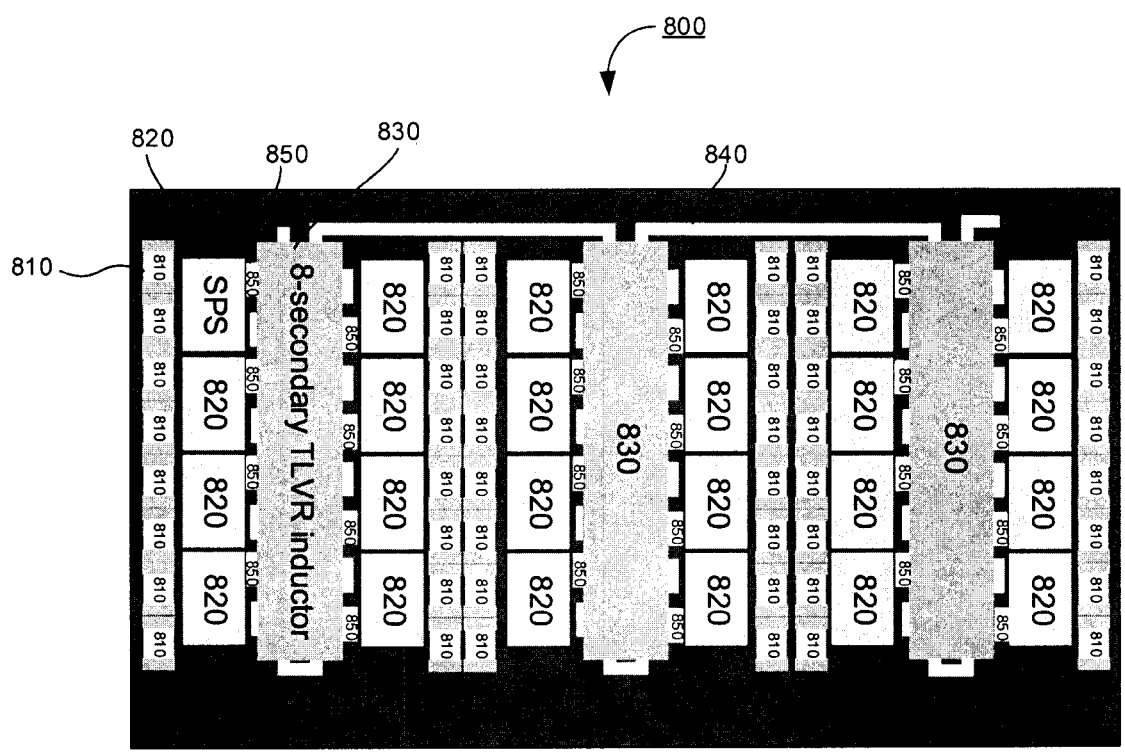
FIG. 8 depicts an illustration of a single-layer vertical power VR module design that uses a multiple-secondary TLVR circuit topology without using a separate compensation inductor, Lc.

FIG. 8 depicts an illustration of a single-layer vertical power VR module design 800 that uses a multiple-secondary TLVR circuit topology without using a separate compensation inductor, Lc. The single-layer TLVR based vertical power VR module design 800 includes input capacitors 810, smart power stages (SPSs) 820, TLVR inductors 830, primary windings 840, and secondary windings 850. The VR module design 800 may not include a compensation inductor, Lc.

The VR module design 800 may be implemented, for example, on an Application Specific Integrated Circuit (ASIC), a Field Programmable Gate Array (FPGA), a Programmable Logic Device (PLD), a specialized or a general purpose Digital Signal Processor, a controller, a state machine, gated logic, discrete hardware components, or any other suitable devices. The VR module design 800 may rely on the package capacitance of the application-specific integrated circuit (ASIC), or other device, on which it is implemented, in the place of the output VR capacitance board. This package capacitance may be used by the VR module design 800 instead of it using any additional output capacitance in either the VR module or a motherboard to which it is coupled. Therefore, the single-layer VR module design 800 may not include a capacitance board of output capacitors, such as cap-board 255 described in connection with FIG. 2. The single-layer VR module design 800 may or may not include an output capacitance associated with the output inductor of each phase.

The single-layer vertical power VR module design 800 may include a multiple-secondary TLVR circuit topology, similar to the single-layer vertical power VR module design 600 described in connection with FIG. 6. For example, the VR module design 800 is shown as including an 8-secondary TLVR circuit topology. The primary windings 840 of the VR module design 800 may be connected in series with each other. Each of the primary windings 840 may be inductively coupled with multiple secondary windings 850 for each of the TLVR inductors 830. Such a VR module design 800 that includes a multiple-secondary TLVR circuit topology may satisfy vertical power requirements by improving power density, transient performance, and power-delivery efficiency, when compared to the VR module design 500 described in connection with FIG. 5. The VR module design 800 structure may include TLVR inductors 830 that may either include traditional copper wire windings or PCB copper trace windings. Although the VR module design 800 includes an 8-secondary TLVR circuit topology, a TLVR circuit topology with 2 to 8, or even more, secondary windings may be used. Considerations for the use of a particular TLVR circuit topology may include phase count flexibility, ferrite core manufacturability, and VR electrical performance.

The compensation inductor, Lc, such as Lc 560 described in connection with FIG. 5 and Lc 660 described in connection with FIG. 6, may be important for transient performance and VR power-delivery efficiency. Therefore, a proper value of Lc may be important for VR design. For lateral power delivery, as opposed to vertical power delivery, the compensation inductor, Lc, may be a separate inductor and may be of a small value. For a vertical power VR module design, however, a separate compensation inductor may occupy significant amounts of additional space, which may reduce power density.

In a single-layer vertical power VR module design using a TLVR circuit topology, such as the VR module design 800, the compensation inductor, Lc, may be implemented with the lumped leakage inductance of the TLVR inductors. Thus, the use of a separate Lc inductor may advantageously be eliminated. This may allow for significant amounts of additional space on the vertical power VR module and an increased power density for the vertical power VR module. For example, the use of a separate Lc inductor may be eliminated if the TLVR inductors are properly designed and implemented with PCB copper traces and/or embedded magnetic cores. In such examples the lumped leakage inductance variation may be small, and thus, a vertical power VR module design that uses lumped leakage inductance instead of a compensation inductor, Lc, may have similar characteristics to a module that uses the compensation inductor.

Figure 9:
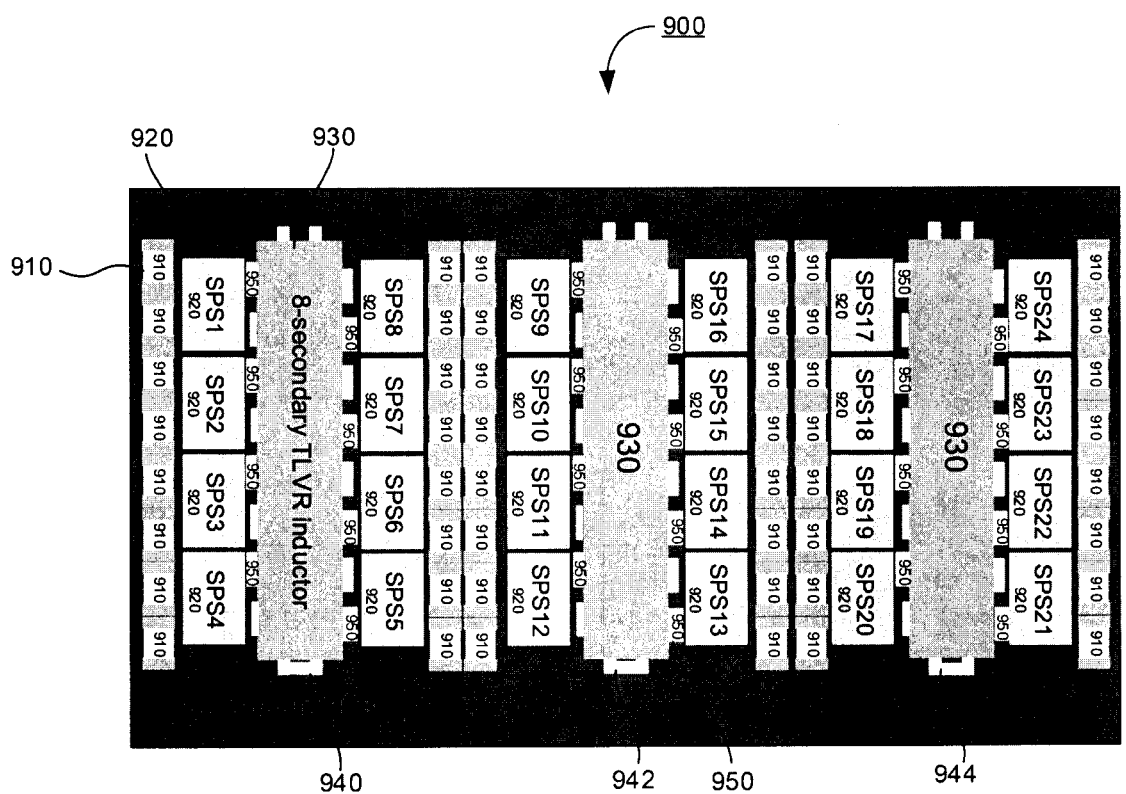
FIG. 9 depicts an illustration of a single-layer 24-phase, 8-phase interleaved vertical power VR module design that uses a multiple-secondary TLVR circuit topology without using a separate compensation inductor, Lc.

FIG. 9 depicts an illustration of a single-layer 24-phase, 8-phase interleaved vertical power VR module design 900 that uses a multiple-secondary TLVR circuit topology without using a separate compensation inductor, Lc. The single-layer TLVR based 24-phase, 8-phase interleaved vertical power VR module design 900 includes input capacitors 910, smart power stages (SPSs) 920, TLVR inductors 930, primary windings 940, 942, and 944, and secondary windings 950. The VR module design 900 may not include a compensation inductor, Lc. In the VR module design 900 using a TLVR circuit topology the compensation inductor, Lc, may be implemented with the lumped leakage inductance of the TLVR inductors. This may be similar to the VR module design 800 described in connection with FIG. 8. Thus, the use of a separate Lc inductor may be eliminated. However, in some examples, three separate compensation inductors, Lc, each associated with one of primary windings 940, 942, and 944, may be used.

The single-layer TLVR based 24-phase, 8-phase interleaved vertical power VR module design 900 may be implemented, for example, on an Application Specific Integrated Circuit (ASIC), a Field Programmable Gate Array (FPGA), a Programmable Logic Device (PLD), a specialized or a general purpose Digital Signal Processor, a controller, a state machine, gated logic, discrete hardware components, or any other suitable devices. The VR module design 900 may rely on the package capacitance of the application-specific integrated circuit (ASIC), or other device, on which it is implemented, in the place of the output VR capacitance board. This package capacitance may be used by the VR module design 900 instead of using any additional VR output capacitance in either the VR module or a motherboard to which it is coupled. Therefore, the VR module design 900 may not include a capacitance board of output capacitors, such as cap-board 255 described in connection with FIG. 2. The single-layer VR module design 900 may or may not include an output capacitance associated with the output inductor of each phase.

The single-layer 24-phase, 8-phase interleaved vertical power VR module design 900 may include a multiple-secondary TLVR circuit topology, similar to the VR module design 800 described in connection with FIG. 8. For example, the VR module design 900 is shown as including an 8-secondary TLVR circuit topology. The windings within each of primary windings 940, 942, and 944 of the VR module design 900 may be connected in series with each other. Each of the windings in primary windings 940, 942, and 944 may be inductively coupled with multiple secondary windings 950 for each of the TLVR inductors 930. Each of the phases of the VR module design 900 may be associated with a SPS 920, which may be labeled according to the integer number of the phase. For example, in FIG. 9, the first phase may be associated with SPS1, the second phase may be associated with SPS2, . . . , and the 24th phase may be associated with SPS24.

Such a VR module design 900 that includes multiple-secondary TLVR circuit topology may satisfy vertical power requirements by improving power density, transient performance, and power-delivery efficiency, when compared to other VR module designs, such as the VR module design 500 described in connection with FIG. 5. The VR module design 900 structure may include TLVR inductors 930 that may either include traditional copper wire windings or PCB copper trace windings. Although the VR module design 900 includes an 8-secondary TLVR circuit topology, a TLVR circuit topology with 2 to 8, or even more, secondary windings may be used. Considerations for the use of a particular TLVR circuit topology may include phase count flexibility, ferrite core manufacturability, and VR electrical performance.

In vertical power VR module applications, input voltage may be lower than 12V and the load current specification may be demanding. For example, the load current may demand more than 16 phases. This may affect the vertical power VR module design. Taking into consideration the maximum voltage stacked on each TLVR winding, linking a large number of phases or all phases together using a single TLVR primary winding may be disadvantageously affect the design of a VR module. Instead, linking the interleaved phases of the TLVR circuit topology used in the design of the VR module and separating the non-interleaved phases may have several advantages. For example, with such a design, the voltage that may be stacked on each TLVR winding may be limited and transient performance may not be impacted.

The single-layer TLVR based 24-phase, 8-phase interleaved vertical power VR module design 900 may include 8-phase interleaving. Thus, each of primary windings 940, 942, and 944 may be associated with 8 phases of the 24 total phases. In the VR module design 900, the phases associated with SPS1 through SPS8 may be interleaved, the phases associated with SPS9 through SPS16 may be interleaved, and the phases associated with SPS17 through SPS24 may be interleaved. In addition, the phases represented by SPS9 and SPS17 may operate in parallel with SPS1, the phases represented by SPS10 and SPS18 may operate in parallel with SPS2, the phases represented by SPS16 and SPS24 may operate in parallel with SPS8. Other similar three phase groups may similarly operate in parallel. Although VR module design 900 includes 24 total phases and 8 phases that are interleaved, any number of phases, which may operate in parallel, and any phase interleaving scheme may similarly be implemented.

Figure 10:
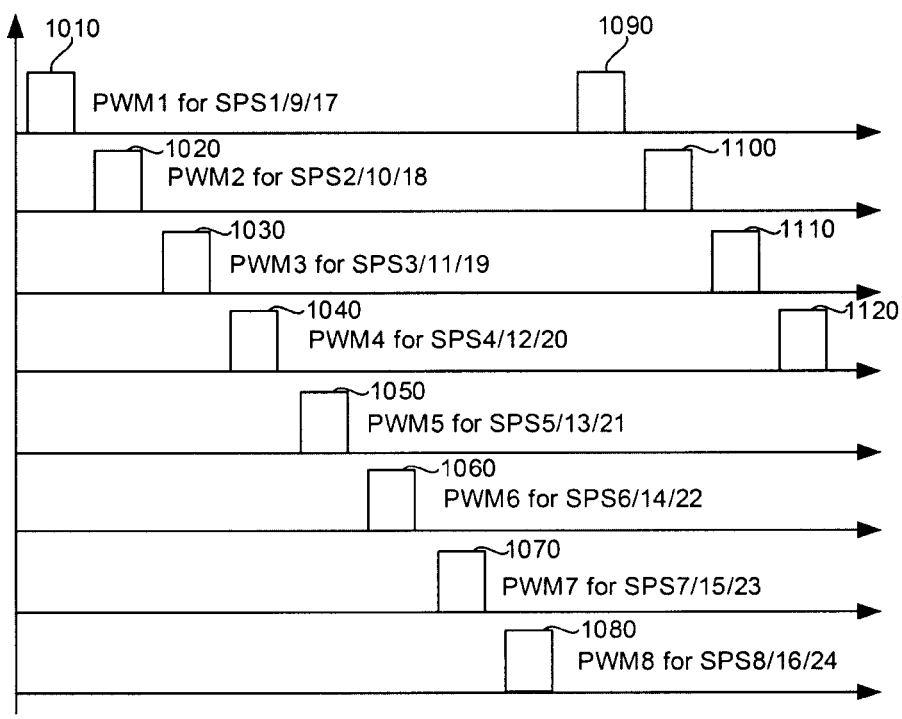
FIG. 10 depicts a diagram of the use of Pulse Width Modulation or other pulsed signals, referred to as PWM and/or pulsed signals below, for input to a single-layer TLVR based 24-phase, 8-phase interleaved vertical power VR module design.

FIG. 10 depicts diagram 1000 of the use of PWM signals for input to a single-layer TLVR based 24-phase, 8-phase interleaved vertical power VR module design, such as VR module design 900 described in connection with FIG. 9. Diagram 1000 includes voltage on the y-axis and time on the x-axis. Diagram 1000 shows signal input signal pulses 1010, 1020, 1030, 1040, 1050, 1060, 1070, 1080, 1090, 1100, 1110, and 1120, which may each be associated with three phases operating in parallel. Each of the pulses may periodically alternate between a high voltage level, such as 5V, and a low voltage level, such as 0V. Alternation between the high voltage level and the low voltage level may or may not be determined by a duty cycle for the pulses.

Diagram 1000 may be better understood when viewed in relation to the single-layer TLVR based 24-phase, 8-phase interleaved vertical power VR module design 900 of FIG. 9. The pulses may be interleaved. For example, a first pulse, 1010 may be input to the TLVR phases associated with SPS1, SPS9, and SPS17 of FIG. 9 in parallel. As another example, a second pulse, 1020 may be input to the TLVR phases associated with SPS2, SPS10, and SPS18 of FIG. 9 in parallel. As yet another example, a third pulse, 1030 may be input to the TLVR phases associated with SPS3, SPS11, and SPS19 of FIG. 9 in parallel. Similarly, pulses 1040, 1050, 1060, 1070, and 1080 may be input to their respective three TLVR phases of FIG. 9. After the eighth pulse, 1080 is input to the TLVR phases associated with SPS8, SPS16, and SPS24 of FIG. 9 in parallel, the pulses may be similarly repeated. Therefore, pulse 1090 may be similar to pulse 1010, pulse 1100 may be similar to pulse 1020, pulse 1110 may be similar to pulse 1030, and pulse 1120 may be similar to pulse 1040.

Figure 11:
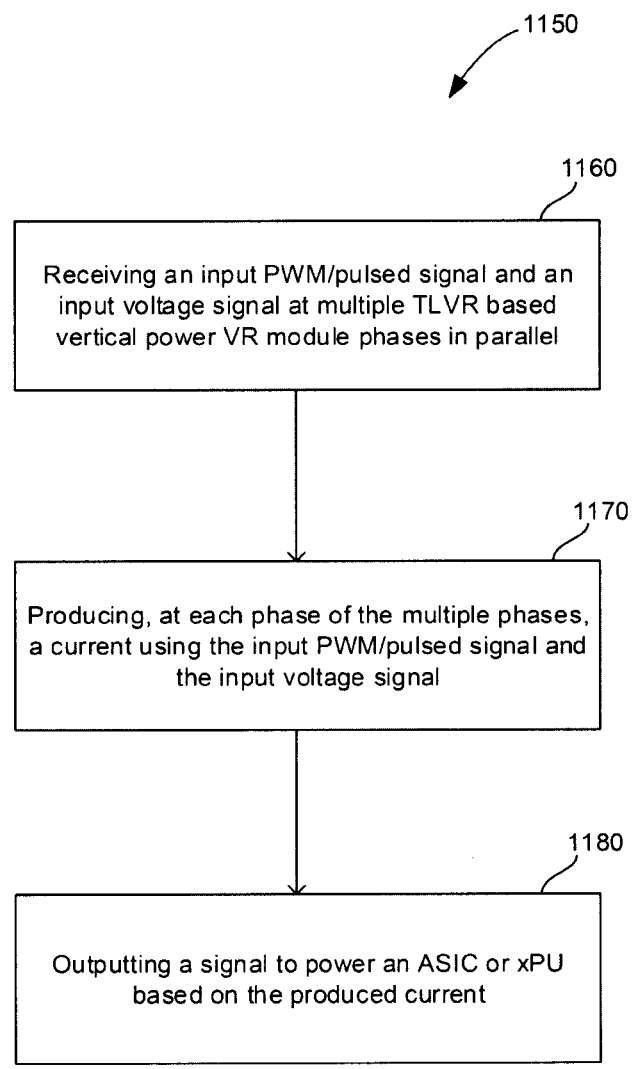
FIG. 11 is a flow diagram of an example process for providing power to an ASIC or xPU.

FIG. 11 is a flow diagram of example process 1150 for providing power to an ASIC or xPU. The process 1150 may be performed, by way of example, by a TLVR based vertical power VR module, such as the VR module design 900 described in connection with FIG. 9. While the operations of the process 1150 are described in a particular order, it should be understood that the order may be modified and operations may be performed in parallel. Moreover, it should be understood that operations may be added or omitted.

In block 1160, multiple phases of a TLVR based vertical power VR module may receive an input PWM signal/pulsed signal in parallel. The multiple phases may also receive an input voltage signal to be converted to the voltage signal desired by the processing unit. Each of the multiple phases may include one or more primary windings and one or more secondary windings. For example, as described in connection with FIG. 10, a pulse of a PWM signal, such as pulse 1010 may be received in parallel by the TLVR phases associated with SPS1, SPS9, and SPS17, described in connection with FIG. 9. The received pulse may be a voltage high signal, such as a 5V signal, or the like.

In block 1170, each of the multiple phases which receive the PWM signal/pulsed signal in parallel in block 1160 may produce an output voltage and/or current signal. This output voltage and/or current signal may be produced by using the energy derived by the received input voltage signal for each phase. The output voltage and/or current signal may be produced by additionally using the input PWM signal/pulsed signal, for example, as a control signal.

In block 1180, the output voltage and/or current signal derived from the TLVR based vertical power VR module in block 1170 may be used to power an ASIC or xPU device. Thus, an output signal used to power the ASIC or xPU may be derived based on the voltage and/or current signal produced at each phase in block 1170. The output signal may be affected by the capacitance inside the device to which the TLVR based vertical power VR module supplies power, therefore making it unnecessary for the TLVR based vertical power VR module to have an output cap-board.

Figure 12:
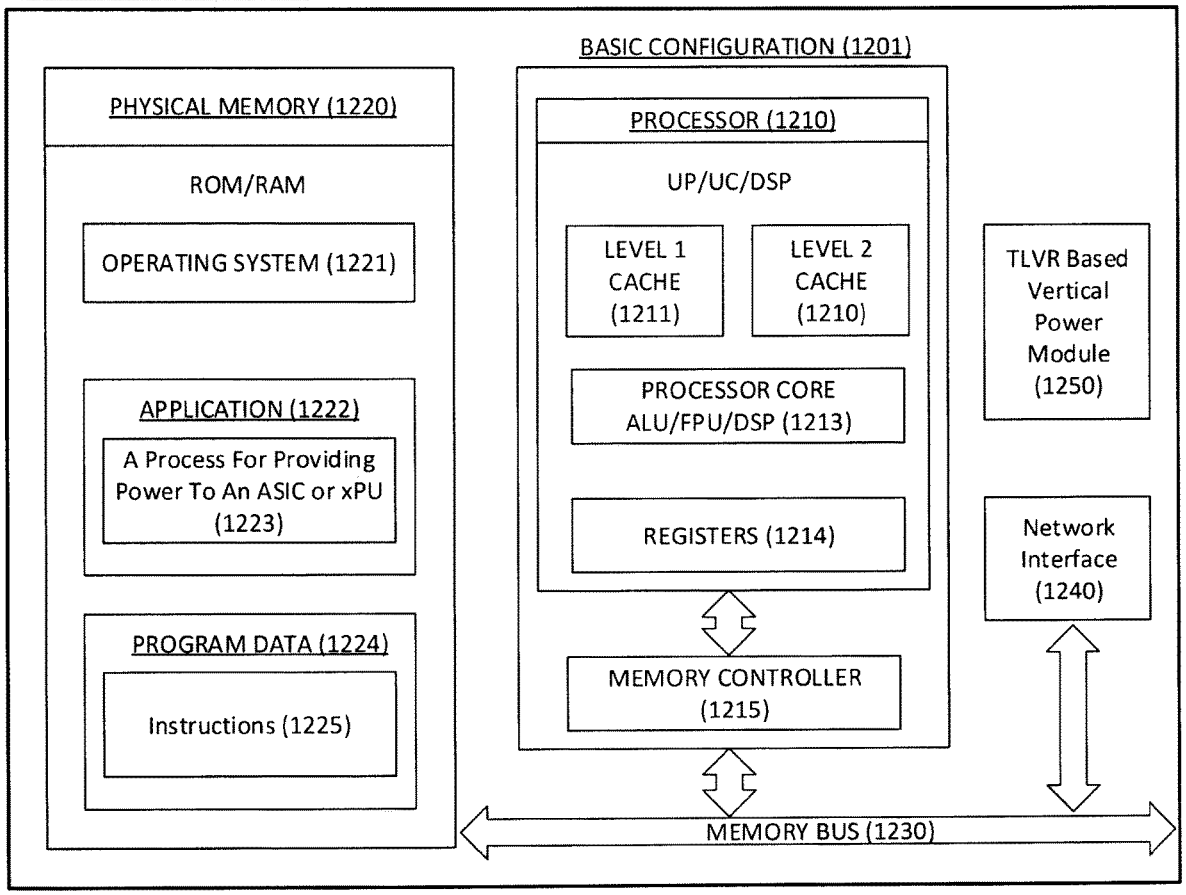
FIG. 12 depicts a block diagram of an example electronic device in accordance with aspects of the disclosure.

FIG. 12 depicts a block diagram of an example electronic device 1200. The electronic device 1200 may include one or more processors 1210, such as one or more xPUs described above, system memory 1220, a bus 1230, the networking interface(s) 1240, TLVR based vertical power VR module 1250, and other components (not shown), such as storage(s), output device interface(s), input device interface(s). A bus 1230 may be used for communicating between the processor 1210, the system memory 1220, the networking interface(s) 1240, and other components.

Depending on the desired configuration, the processor 1210 may be of any type including but not limited to a microprocessor, a microcontroller, a digital signal processor (DSP), or any combination thereof. The processor 1210 may include one more level of caching, such as a level one cache 1211 and a level two cache 1212, a processor core 1213, and registers 1214. The processor core 1213 may include an arithmetic logic unit (ALU), a floating point unit (FPU), a DSP core, or any combination thereof. A memory controller 1215 may also be used with the processor 1210, or in some implementations the memory controller 1215 can be an internal part of the processor 1210.

Depending on the desired configuration, the physical memory 1220 may be of any type including but not limited to volatile memory, such as RAM, non-volatile memory, such as ROM, flash memory, etc., or any combination thereof. The physical memory 1220 may include an operating system 1221, one or more applications 1222, and program data 1224. Non-transitory computer-readable medium program data 1224 may include storing instructions 1225 that, when executed by the one or more processing devices, implement a process for providing power to an ASIC or xPU 1223. In some examples, the one or more applications 1222 may be arranged to operate with program data 1224 on an operating system 1221.

The electronic device 1200 may have additional features or functionality, and additional interfaces to facilitate communications between the basic configuration 1201 and any required devices and interfaces.

Physical memory 1220 may be an example of computer storage media. Computer storage media includes, but is not limited to, RAM, ROM, EEPROM, flash memory or other memory technology, or any other medium which can be used to store the desired information and which can be accessed by electronic device 1200. Any such computer storage media can be part of the device 1200.

Network interface(s) 1240 may couple the electronic device 1200 to a network (not shown) and/or to another electronic device (not shown). In this manner, the electronic device 1200 can be a part of a network of electronic devices, such as a local area network ("LAN"), a wide area network ("WAN"), an intranet, or a network of networks, such as the Internet. In some examples, the electronic device 1200 may include a network connection interface for forming a network connection to a network and a local communications connection interface for forming a tethering connection with another device. The connections may be wired or wireless. The electronic device 1200 may bridge the network connection and the tethering connection to connect the other device to the network via the network interface(s) 1240.

TLVR based vertical power VR module 1250 may include any one of the VR module designs shown in FIGS. 3, 5, 6, 8 and/or 9. TLVR based vertical power VR module 1250 may be used to power one or more components of the electronic device 1200. For example, TLVR based vertical power VR module 1250 may be used to provide power to the one or more processors 1210.

The TLVR based vertical power VR module 1250 may not include an output capacitance board. The TLVR based vertical power VR module 1250 may include a leakage inductance configured to act as a compensation inductor, Lc. The TLVR based vertical power VR module 1250 may be implemented using a single multi-layer PCB/single-layer design. Thus, TLVR based vertical power VR module 1250 may have electrical and mechanical portions that are simplified compared to conventional VR modules. As a result, mass production manufacturing concerns associated with conventional VR modules, such as those concerns associated with a multi-layer structure design may be reduced. In addition, as a result, TLVR based vertical power VR module 1250 may have a reduced number of electrical and/or mechanical components, which may increase the reliability of the VR module 1250 while also increasing the efficiency of the VR module 1250.

The single-layer design may also include benefits such as a reduced weight, a thinner VR module design, elimination of a layer-to-layer bonding interface, and reduced reflow times, which may also result in greater reliability. The single-layer TLVR based vertical power VR module 1250 may also enable better transient performance and better manufacturability. Any or all components of electronic device 1200 may be used in conjunction with the subject of the present disclosure.

The electronic device 1200 may be implemented as a portion of a small form factor portable (or mobile) electronic device such as a speaker, a headphone, an earbud, a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 1200 may also be implemented as a personal computer including both laptop computer and non-laptop computer configurations. The electronic device 1200 may also be implemented as a server, computing platforms, or a large-scale system.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. A vertical power module, the vertical power module comprising:
    a plurality of inductors;
    a plurality of primary windings associated with the inductors; and
    a plurality of secondary windings associated with the inductors, wherein respective secondary windings of the plurality of secondary windings are magnetically coupled with at least one winding of the plurality of primary windings, wherein the vertical power module does not include a capacitance board and is configured to generate an output current greater than 1000 A.

2. The vertical power module of claim 1, wherein the vertical power module is configured to receive an input voltage of 12V or less.

3. The vertical power module of claim 1, wherein the vertical power module is configured to leverage in-package capacitors of die for decoupling capacitance.

4. The vertical power module of claim 1, wherein the vertical power module comprises a plurality of phases, each phase of the plurality of phases being configured to produce a respective portion of the current signal.

5. The vertical power module of claim 4, wherein each phase of the plurality of phases includes at least one primary winding of the plurality of primary windings and at least one secondary winding of the plurality of secondary windings.

6. The vertical power module of claim 1, wherein the plurality of primary windings and the plurality of secondary windings include magnetic cores.

7. The vertical power module of claim 1, wherein at least one primary winding of the plurality of primary windings and at least one secondary winding of the plurality of secondary windings is implemented with copper windings.

8. The vertical power module of claim 7, wherein at least one primary winding of the plurality of primary windings and at least one secondary winding of the plurality of secondary windings is implemented with printed circuit board (PCB) copper trace windings.

9. A system comprising:
    a power module configured to mount to a first surface of a printed circuit board, wherein the power module is configured to provide a current signal to a die, the current signal having a current greater than a current input into the power module, wherein the current output by the power module is greater than 1000 A, and wherein the power module does not include a capacitance board.

10. The system of claim 9, wherein a voltage input into the power module is 12V or less.

11. The system of claim 9, wherein the power module is a single-layer power module.

12. The system of claim 9, further comprising the die, wherein the die is mounted to a second surface of the printed circuit board, opposite the power module.

13. The system of claim 12, further comprising the printed circuit board, wherein:
    the die is directly coupled to the second surface of the printed circuit board, and
    the power module is directly coupled to the first surface of the printed circuit board.

14. The system of claim 12 wherein the die comprises in-package capacitors, and
    wherein the in-package capacitors are configured to provide decoupling capacitance for the power module.

15. The system of claim 9, wherein the power module comprises a plurality of phases, each phase of the plurality of phases being configured to produce a respective portion of the current signal.

16. The system of claim 15, wherein each phase of the plurality of phases includes at least one primary winding and at least one secondary winding.

17. The system of claim 16, wherein one or more of the at least one primary winding and one or more of the at least one secondary winding is implemented with copper windings.

18. The system of claim 16, wherein one or more of the at least one primary winding and one or more of the at least one secondary winding is implemented with printed circuit board (PCB) copper trace windings.

* * * * *